United States Patent [19]
Behrens

[11] 3,963,797
[45] June 15, 1976

[54] ACRYLIC ELASTOMER COMPOSITIONS WITH IMPROVED AGING PROPERTIES
[75] Inventor: Rudolf Adolf Behrens, Gladstone, N.J.
[73] Assignee: American Cyanamid Company, Stamford, Conn.
[22] Filed: Nov. 27, 1974
[21] Appl. No.: 527,672

[52] U.S. Cl. ................ 260/837 R; 260/18 EP; 260/42; 260/45.9 R; 260/836
[51] Int. Cl.² ........................................ C08G 45/04
[58] Field of Search ............................ 260/836, 837

[56] References Cited
UNITED STATES PATENTS
3,135,716  6/1964  Uraneck .......................... 260/836
3,266,971  8/1966  Miller ............................. 260/836
3,465,058  9/1969  McCarthy ....................... 260/836
3,468,976  9/1969  Yanai .............................. 260/883
3,529,036  9/1970  Edwards ......................... 260/836
3,673,275  6/1972  Simms ......................... 260/837 R
3,697,620  10/1972  Ermidis .......................... 260/836

Primary Examiner—Murray Tillman
Assistant Examiner—T. Pertilla
Attorney, Agent, or Firm—Charles J. Fickey

[57] ABSTRACT

Acrylate elastomer compositions having improved aging resistance due to addition of epoxy-containing compounds.

3 Claims, No Drawings

ACRYLIC ELASTOMER COMPOSITIONS WITH IMPROVED AGING PROPERTIES

This invention relates to acrylate elastomer compositions exhibiting improved aging resistance. More particularly, it relates to a method for improving the resistance of acrylate elastomers to deterioration, particularly permanent deformation, in an environment of high air temperatures and hot oil.

Acrylate elastomers are used extensively in automobile engines and transmission as gaskets and seals, where they are exposed to an environment of high air temperatures and hot oil. In such an environment the elastomers lose strength and elasticity, become harder, exhibit a tendency to swell, and display a permanent deformation under compression (compression set), particularly when used as gaskets. The acrylate elastomers are among the best and most widely used elastomers in such an environment, but they are not completely satisfactory. Some of the deleterious effects of such an environment on physical properties can be reduced by the addition of a plasticizer, but this is not always a satisfactory solution since the plasticizer, to a greater or lesser extent, volatilizes in time and is thereby removed from the elastomer. Plasticizers, in general, have had no significant effect on compression set, a property extremely important in gasket material. There has been a continuing effort to improve the physical properties of acrylate elastomers and to improve retention of those properties in the aforementioned environment.

It is a principal object of the present invention to provide acrylate elastomer compositions with improved resistance to aging in an environment of high air temperatures and hot oil. It is another object of the invention to provide acrylate elastomer compositions with improved resistance to permanent deformation under compression and a reduced tendency to swell in hot oil.

In accordance with the objects of this invention, I have discovered that the addition of certain epoxy containing compounds or compositions to an acrylate elastomer have the effect of improving the physical properties thereof, especially compression set, in a hot air and oil environment.

The epoxy containing compounds which are added in the present invention have at least one epoxy group and an epoxide equivalent of about 70 to 500, preferably 100 to 200. The epoxide equivalent is the grams of compound containing 1 gram-equivalent of epoxide. The compounds are liquids of low melting solids. A preferred species of epoxides is a class of epichlorohydrin-bisphenol A condensates known as EPON resins (Shell Chemical Co.) having the structure:

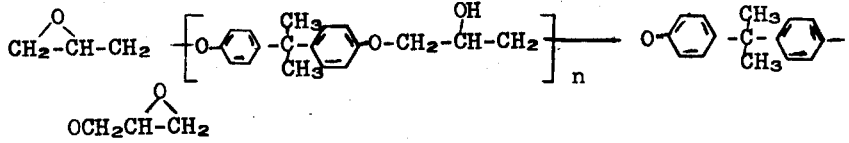

where n is an integer sufficient to provide a resin having an epoxide equivalent of about 150 to 500, preferably 100 to 200.

While the epoxy containing compounds defined above are preferred, the invention is not limited thereto. Representative epoxy containing compounds useful in the present invention include, but are not limited to, the following: vinyl cyclohexene diepoxide (ERL 4206), 3,4-epoxycyclohexyl acetic acid, 3,4-epoxycyclohexyl ester (ERL 4221), both available from Union Carbide Co.; diglycidylether of 1,4-butanediol (Araldite RD-2, Ciba); diglycidylether of 4,4'-isopropylidenebisphenol (DER-332), glycidyl ether of phenolformaldehyde condensate (DEN-438), polyglycol diepoxides represented by the formula:

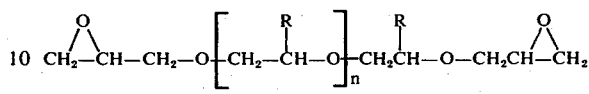

wherein n has the same meaning as previously defined, particularly DER-736, all available from Dow Chemical Co., and the like.

The epoxy containing compound may be incorporated into the acrylate elastomer composition by adding it during the polymerization reaction, by mixing it with the finished polymer or by adding it during compounding of the elastomer with other conventional compounding ingredients. It is used in an amount of from about 1 to 20 percent by weight, depending on the epoxide equivalent of the compound. A generally effective amount of epoxy containing compound will be in the range of about 5 to 10 weight percent based on the elastomer. It will be within the skill of the art to determine the effective level of any particular epoxy containing compound, consistent with the objects of the invention.

This invention contemplates broadly all vulcanizable acrylate elastomer compositions having an active-halogen atom, including those elastomers disclosed in U.S. Pat. Nos. 3,201,373; 3,397,193 and 3,312,677. More specifically, the invention contemplates acrylic elastomers prepared by polymerizing alkyl or alkoxy acrylates, e.g.: methoxy, ethyl acrylate, with various chlorine or bromine containing compounds, such as, for example, a 95/5 copolymer of ethyl acrylate and chloroethyl vinyl ether or vinyl chloroacetate. The vinyl chloroacetate may optionally range from 0.5 to 15 weight percent of the elastomer composition. The elastomeric copolymers may optionally contain minor amounts of other copolymerizable vinyl monomers, such as acrylonitrile. The polymers are made by conventional free radical initiated emulsion or suspension polymerization systems.

The elastomer compositions may be compounded with other conventional compounding ingredients such as carbon black, fillers, antioxidants, vulcanization accelerators, sulfur, and the like.

Physical properties are determined according to conventional procedures. Volume swell in hydrocarbon oils is determined in accordance with ASTM D 471. Compression set is determined in accordance with ASTM D 395, Method B.

The invention is more fully described by the following examples.

EXAMPLE 1

The epoxy compounds shown in Table I were incorporated, in the amounts shown, into separate portions, containing 100 parts by weight of elastomer, of the following formulation, by compounding on a standard rubber mill.

FORMULATION

| | Parts by Weight |
|---|---|
| Elastomer (1) | 100 |
| FEF Carbon Black | 60 |
| Stearic Acid | 1.5 |
| Sulfur | 0.25 |
| Sodium 2-ethylhexanoate (2) | 8 |
| Antioxidant (3) | 2 |
| Sodium Aluminosilicate | 12 |

(1) 94% of a mixture of 82 percent ethylacrylate and 18 percent butylacrylate copolymerized with 6 percent vinyl chloroacetate.
(2) 50 percent sodium 2-ethylhexanoate, 30 percent hydrous calcium silicate, 20 percent water.
(3) Di(beta-naphthyl)-p-phenylene diamine.

TABLE I

| Epoxy Additive | I | II | III | IV | V | VI | VII | VIII | Control |
|---|---|---|---|---|---|---|---|---|---|
| A | 5 | | | | | | | | |
| B | | 15 | | | | | | | |
| C | | | 5 | | | | | | |
| D | | | | 5 | | | | | |
| E | | | | | 5 | | | | |
| F | | | | | | 5 | | | |
| G | | | | | | | 5 | 5 | |

Stress-Strain Properties, Cured 15 min. at 330°F. Post Cured 4 hours at 176°C.

| Original | | | | | | | | | |
|---|---|---|---|---|---|---|---|---|---|
| 100% Modulus, psi | 1205 | 830 | 825 | 1145 | 1340 | 1305 | 1330 | 1480 | 1555 |
| Tensile, psi | 1825 | 1685 | 1695 | 1850 | 1890 | 1775 | 1810 | 1885 | 1930 |
| Elongation, % | 150 | 200 | 200 | 160 | 150 | 140 | 150 | 140 | 135 |
| Hardness, Shore A | 72 | 71 | 69 | 76 | 75 | 76 | 77 | 77 | 80 |
| Compression Set* (70 hrs. at 150°C.) % Method B | 34.8 | 30.5 | 30 | 34.5 | 28.3 | 35 | 28.6 | 31.1 | 46.7 |

*Compositions post-cured for 6 hours at 176°C. instead of 4 hours at 176°C.

Epoxy Additive
A. EPON 828 (Shell Chemical Co.), epoxide equivalent 180–195.
B. Polyglycol diepoxide, DER-736 (Dow Chemical Co.), epoxide equivalent 175–205.
C. Glycidyl ester of phenol-formaldehyde condensate (DEN-431, Dow Chemical Co.), epoxide equivalent 172–179.
D. 3,4-Epoxycyclohexyl acetic acid, 3,4-epoxycyclohexyl ester, ERL-4221 (Union Carbide Co.).
E. Bis(3,4-epoxy-6-methyl cyclohexylmethyl)adipate.
F. Vinylcyclohexene diepoxide, ERRA-4206 (Union Carbide Co.).
G. 2-[3,4-Epoxycyclohexyl-5,5-spiro(3,4-epoxy)cyclohexane]-m-dioxane.

The data in Table I illustrates the effect of the various epoxy containing compounds in improving compression set.

EXAMPLE 2

The epoxy compounds show in Table II were incorporated, in the amounts shown, into separate portions, containing 100 parts by weight of elastomer, of the following formulation by compounding on a standard rubber mill.

FORMULATION

| | Parts by Weight |
|---|---|
| Elastomer (1) | 100 |
| m-phenylene bismaleimide | 0.75 |
| Antioxidant (2) | 2.0 |
| Sodium 2-ethylhexanoate | 8.0 |
| Stearic Acid | 2.0 |
| Sulfur | 0.25 |
| FEF Carbon black | 50 |
| Sodium aluminosilicate | 12 |

(1) 94 percent of the mixture of 40 percent butylacrylate, 30 percent ethylacrylate and 23 percent methoxyethylacrylate copolymerized with 6 percent vinyl chloroacetate in the presence of a low molecular weight, polybutadiene, 1 percent on weight of polymer.
(2) Reaction product of diphenylamine and acetone.

TABLE II

| Epoxide Additive | Control | IX | X | XI | XII | Parts by Weight XIII | XIV |
|---|---|---|---|---|---|---|---|
| EPON 812 (1) | | | | | | 5.0 | |
| EPON 828 | | 1.0 | 2.5 | 5.0 | 10.0 | | |
| EPON 834 (2) | | | | | | | 5.0 |

Stress-Strain Properties: Cured 15 min. at 330°F., followed by Post-Curing 4 hours at 176°C. in Air Oven

| Original | | | | | | | |
|---|---|---|---|---|---|---|---|
| 100% Modulus, psi | 1375 | 1250 | 1050 | 975 | 825 | 725 | 1025 |
| Tensile, psi | 1590 | 1585 | 1515 | 1510 | 1335 | 1335 | 1465 |
| Elongation, % | 115 | 120 | 135 | 150 | 150 | 160 | 145 |
| Hardness, Shore A | 72 | 71 | 70 | 65 | 60 | 63 | 67 |
| Oven Aged One Week at 176°C. | | | | | | | |
| Tensile, psi | 1435 | 1490 | 1485 | 1465 | 1450 | 1350 | 1450 |
| % Change | −10 | −6 | −2 | −3 | +9 | +1 | −1 |
| Elongation, % | 80 | 95 | 105 | 130 | 150 | 135 | 120 |
| % Change | −30 | −21 | −15 | −13 | 0 | −16 | −17 |
| Hardness, Shore A | 80 | 78 | 76 | 75 | 70 | 74 | 76 |
| % Change | +8 | +7 | +6 | +10 | +10 | +11 | +9 |
| ASTM No. 3 Oil One Week at 150°C | | | | | | | |
| Tensile, psi | 1285 | 1290 | 1285 | 1215 | 1100 | 1235 | 1240 |
| % Change | −19 | −19 | −15 | −20 | −18 | −7 | −15 |
| Elongation, % | 90 | 100 | 115 | 125 | 140 | 145 | 125 |
| % Change | −22 | −17 | −15 | −17 | −7 | −9 | −14 |
| Hardness, Shore A | 65 | 60 | 60 | 55 | 52 | 52 | 55 |
| % Change | −7 | −11 | −10 | −10 | −8 | −11 | −12 |
| Volume Change, % | 20.3 | 20.3 | 19.0 | 15.6 | 11.3 | 16.3 | 17.5 |

TABLE II-continued

| Epoxide Additive | Control | IX | X | XI | XII | Parts by Weight XIII | XIV |
|---|---|---|---|---|---|---|---|
| Compression Set, % (3) 70 Hrs. at 150°C. | 36.8 | 35.4 | 35.3 | 31.9 | 27.8 | 26.7 | (32) |

(1) EPON 812, aliphatic modification of EPON Resins, epoxide equivalent 140–160
(2) Epoxide equivalent 230–280
(3) Cured 20 minutes at 330°F. post cured 6 hours at 176°C.

The data in Table II show that the epoxy additives provide better retention of physical properties on air aging, better retention of elongation on oil aging, better resistance to swell in oil, and better compression set resistance.

EXAMPLE 3

FORMULATION

| | Parts by Weight |
|---|---|
| Elastomer (1) | 100 |
| FEF Carbon Black | 50 |
| Sodium Alumino Silicate | 12 |
| m-Phenylenebismaleimide | 0.75 |
| Antioxidant (2) | 2.0 |
| Sodium 2-ethylhexanoate (3) | 7.0 |
| Stearic Acid | 2.0 |
| Sulfur | 0.25 |

(1) 94% of a mixture of 40% butylacrylate, 30% ethylacrylate and 23% methoxyethylacrylate copolymerized with 6% vinyl chloroacetate in the presence of a low molecular weight, polybutadiene, 1% on weight of polymer.
(2) Condensation product of diphenylamine and acetone.
(3) 50% aqueous solution.

An epichlorohydrin-Bisphenol A condensate with an epoxide equivalent of 180–195, available as EPON 828 (Shell Chemical Co.) was evaluated in the above formulation, as shown in Table III, by compounding on a standard two-roll rubber mill.

TABLE III

| Epoxide | Control | XV | Parts by Weight XVI | XVII |
|---|---|---|---|---|
| EPON 828 | — | 10 | 20 | 30 |
| Instron Stress-Strain Properties (cured 15 minutes at 330°F. post cured 4 hours at 170°C.) | | | | |
| Original | | | | |
| Modulus, 100%, psi | 1325 | 650 | 500 | 325 |
| Tensile, psi | 1560 | 1405 | 1285 | 1135 |
| Elongation, % | 115 | 170 | 200 | 240 |
| Hardness, Shore A | 70 | 60 | 58 | 50 |
| Air Aged One Week at 176°C. | | | | |
| Modulus, 100%, psi | | | | |
| Tensile, psi | 1525 | 1450 | 1270 | 1100 |
| Elongation, % | 85 | 150 | 160 | 190 |
| Hardness, Shore A | 75 | 60 | 61 | 68 |
| Oil Aging One Week at 150°C. in ASTM No. 3 Oil | | | | |
| Tensile, psi | 945 | 1015 | 1050 | 1085 |
| Elongation, % | 75 | 140 | 150 | 180 |
| Hardness, Shore A | 60 | 45 | 45 | 43 |
| Volume Swell, % | 27 | 21.2 | 16.6 | 11.2 |
| Compression Set (70 Hrs. at 150°C; Sample Cured 20 min. at 330°F; Post Cured 6 Hrs. at 176°C) | | | | |
| Method B, % | 37.9 | 28.4 | 31.3 | 37.4 |

The data in Table III show the effect on physical properties of increasing the concentration of the epoxide. Although all concentrations provide improved aging properties, particularly in oil, the compression set is not improved by large concentrations (composition XVII).

EXAMPLE 4

FORMULATION

| | Parts by Weight |
|---|---|
| Elastomer (1) | 100 |
| FEF Carbon Black | 50 |
| Sodium Aluminosilicate | 12 |
| m-Phenylenebismaleimide | 0.75 |
| Sodium 2-Ethylhexanoate (2) | 8.0 |
| Antioxidant (3) | 2.0 |
| Stearic Acid | 2.0 |
| Sulfur | 0.25 |

(1) 94% of a mixture of 40% butylacrylate, 30% ethylacrylate and 23% methoxythylacrylate copolymerized with 6% vinyl chloroacetate in the presence of a low molecular weight, polybutadiene, 1% on weight of polymer.
(2) 50% aqueous solution.
(3) Condensation product of diphenylamine and acetone.

An aliphatic modification of an epichlorohydrin-Bisphenol A condensate, in which the Bisphenol A is replaced by an aliphatic diol, was evaluated in the above formulation. The epoxide is available as EPON 812, epoxide equivalent 140–160 (Shell Chemical Co.).

TABLE IV

| Epoxide | Control | XVIII |
|---|---|---|
| EPON 812 | — | 10 |
| Instron Stress-Strain Properties (cured 15 minutes at 330°F., Post Cured 4 hours at 176°C.) | | |
| Original | | |
| Modulus, 100%, psi | 1350 | 525 |
| Tensile, psi | 1825 | 1390 |
| Elongation, % | 125 | 215 |
| Hardness, Shore A | 73 | 56 |
| Air Aged One Week at 176°C. | | |
| Tensile, psi | 1650 | 1210 |
| Elongation, % | 100 | 170 |
| Hardness, Shore A | 82 | 71 |
| Oil Aging, One Week at 150°C, in ASTM No. 3 Oil | | |
| Tensile, psi | 1375 | 1175 |
| Elongation, % | 95 | 165 |
| Hardness, Shore A | 66 | 51 |
| Volume Swell,% | 21.3 | 12.8 |
| Compression Set, 70 Hrs. at 150°C. | | |
| % | 33.1 | 23.7 |

The data show a marked improvement in compression set.

EXAMPLE 5

FORMULATION

|  | Parts by Weight |
| --- | --- |
| Elastomer (1) | 100 |
| FEF Carbon black | 60 |
| Stearic Acid | 1.5 |
| Antioxidant (2) | 4 |
| Sulfur | 0.25 |
| Sodium 2-ethylhexanoate | 8 |
| Sodium aluminosilicate | 12 |

(1) 94% ethyl acrylate copolymerized with 6% vinyl chloroacetate.
(2) Reaction product of diphenylamine and acetone.

The epoxy compounds shown in Table V were incorporated, in the amounts shown, into separate portions, containing 100 parts by weight of elastomer, of the above formulation, by compounding on a standard rubber mill.

What is claimed:

1. An acrylate elastomer composition which is a copolymer of one or more acrylic acid esters and from about 0.5 to 15 weight percent based on the elastomer composition of vinyl chloroacetate comprising from about 1 to 20 weight percent, based on the weight of said elastomer, of a compound containing at least one epoxy group and having an epoxide equivalent, defined as the grams of said compound containing 1 gram equivalent of epoxide, of from about 70 to 500.

2. The composition of claim 1 wherein said epoxy containing compound is a member selected from epichlorohydrin-4,4'-isopropylidenebisphenol condensates of the formula:

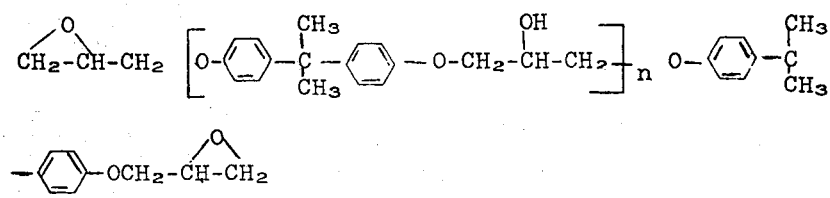

wherein $n$ is an integer sufficient to provide an epoxide equivalent of from about 150 to 250.

3. A method for improving the resistance of acrylate elastomer compositions as in claim 1, towards deterioration due to elevated temperatures and hydrocarbon oils, comprising adding thereto from about 1 to 20 percent by weight of a compound containing at least one epoxy group and having an epoxide equivalent of from about 70 to 500.

TABLE V

| Epoxy Additive | Control | XIX | XX | XXI | XXII | XXIII |
| --- | --- | --- | --- | --- | --- | --- |
| H |  | 2 |  |  |  |  |
| J |  |  | 5 |  |  |  |
| K |  |  |  | 5 |  |  |
| L |  |  |  |  | 5 |  |
| M |  |  |  |  |  | 5 |
| Stress-Strain Properties, cured 15 minutes at 330°F., Post-cured 4 hours at 350°F. | | | | | | |
| Original | | | | | | |
| 100% Modulus, psi | — | 1810 | 1300 | 1540 | 1410 | — |
| Tensile, psi | 1710 | 1880 | 1740 | 1840 | 1765 | 1820 |
| Elongation, % | 95 | 102 | 140 | 120 | 135 | 90 |
| Hardness, Shore A | 82 | 84 | 81 | 84 | 82 | 83 |
| Compression Set: | | | | | | |
| Post-Cured 6 hours at 350°F; ASTM D395, Method B, 70 hours at 300°F. | | | | | | |
| % | 37.8 | 30.8 | 30.6 | 32.4 | 29.5 | 32.6 |

Epoxy Additive
H. Glycidol
J. DER-741, Dow Chemical Co.

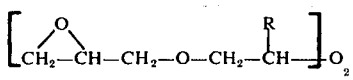

K. DEN-438, Dow Chemical Co.; Epoxide equivalent 175-182

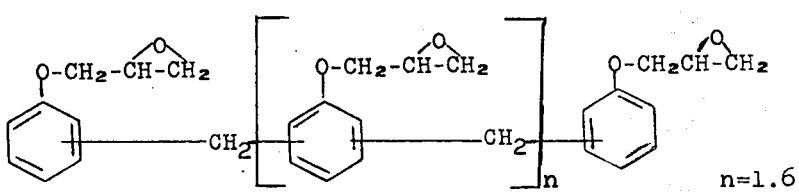

$n=1.6$

L. Allyl glycidyl ether

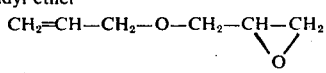

M. Butylene oxide.